(12) United States Patent
Ferlitsch

(10) Patent No.: US 7,420,698 B2
(45) Date of Patent: Sep. 2, 2008

(54) SYSTEMS AND METHODS FOR PROVIDING COMPUTER BASED PRINTING, SCANNING AND FAXING

(75) Inventor: Andrew Rodney Ferlitsch, Tigard, OR (US)

(73) Assignee: Sharp Laboratories of America, Inc., Camus, WA (US)

(*) Notice: Subject to any disclaimer, the term of this patent is extended or adjusted under 35 U.S.C. 154(b) by 963 days.

(21) Appl. No.: 10/621,176

(22) Filed: Jul. 16, 2003

(65) Prior Publication Data

US 2005/0015428 A1  Jan. 20, 2005

(51) Int. Cl.
  G06F 3/12  (2006.01)
  G06F 15/00  (2006.01)
  G06K 1/00  (2006.01)
(52) U.S. Cl. .................. 358/1.15; 358/1.1; 358/401; 358/468
(58) Field of Classification Search .............. 358/1.1, 358/1.15, 400, 401, 407, 442, 468; 379/100.01, 379/100.09
See application file for complete search history.

(56) References Cited

U.S. PATENT DOCUMENTS

| | | | |
|---|---|---|---|
| 5,937,150 A * | 8/1999 | Phan | 358/1.15 |
| 6,081,347 A | 6/2000 | Yasuda | 358/400 |
| 6,130,760 A | 10/2000 | Nickerson | 358/442 |
| 6,266,150 B1 | 7/2001 | Brossman et al. | 358/1.15 |
| 6,424,427 B1 | 7/2002 | Herriot | 358/1.16 |
| 6,426,798 B1 | 7/2002 | Yeung | 358/1.13 |
| 6,438,574 B1 | 8/2002 | Nagashima | 709/102 |
| 6,487,611 B1 * | 11/2002 | Brusky et al. | 710/10 |
| 2002/0101600 A1 | 8/2002 | Sabbagh et al. | 358/1.13 |

FOREIGN PATENT DOCUMENTS

| | | |
|---|---|---|
| EP | 484145 A2 * | 5/1992 |
| JP | 06-253070 | 9/1994 |
| JP | 08-331306 | 12/1996 |
| JP | 2000-324286 | 11/2000 |
| JP | 2000-332942 | 11/2000 |

OTHER PUBLICATIONS www.lexmark.com/us/solutions/software/optraforms$_{13}$ director_des.html; Oct. 9, 2003.

* cited by examiner

*Primary Examiner*—Thomas D Lee
(74) *Attorney, Agent, or Firm*—Michael F. Krieger; Kirton & McConkie

(57) ABSTRACT

Systems and methods for providing computer based printing, scanning and faxing. A computer device is used in a system configuration to describe a fax operation as a sequence of commands from a fax description language (FDL) forming a program unit, wherein the program unit may be constructed, transmitted and executed in a single operational step. The computer device is also used to configure, send and/or retrieve facsimile messages for fax jobs, wherein the fax job requests are sent through an existing print subsystem. Accordingly, a user may send a fax configuration or fax job send or retrieve request as a print job.

21 Claims, 15 Drawing Sheets

SYSTEMS AND METHODS FOR PROVIDING COMPUTER BASED PRINTING, SCANNING AND FAXING

BACKGROUND OF THE INVENTION

1. Field of the Invention

The present invention relates to providing computer based printing, scanning and faxing. In particular, the present invention relates to systems and methods for describing a fax operation as a sequence of commands from a fax description language (FDL) forming a program unit, wherein the program unit may be constructed, transmitted and executed in a single operational step. The present invention further relates to systems and methods for configuring, sending and/or retrieving facsimile messages for fax jobs, wherein the fax job requests are sent through a print subsystem.

2. Background and Related Art

Techniques currently exist whereby information may be sent or received via facsimile. Some techniques allow for information to be sent/received via facsimile over a publicly switched telephone network (PSTN). A user may employ a fax machine to send information via facsimile by placing a document in a document feeder of the fax machine, entering at a front panel the telephone number of a destination fax machine, and pressing the send button to initiate the fax transmission. The fax machine scans the document, converts the analog signals to a fax format, connects to the destination fax machine, and transmits a copy of the document to the destination fax machine across the PSTN. A confirmation may be provided to the user to acknowledge that the fax transmission occurred.

Once the information sent via facsimile has arrived at the destination fax machine, the information is converted from a fax formatted document to an image format native to the destination fax machine, which then prints the image on paper and delivers it to an output tray. A user at the destination fax machine may then obtain the faxed copy of the document from the output tray.

Other techniques do not require either the PSTN or a paper output/input at one or both ends. For example, one technique sends a facsimile from an electronic image out to the PSTN rather than requiring a document to be loaded into a document feeder. The user sends the electronic image by use of a fax application, which converts the image to a fax format (e.g., G3 or G4). The fax application transmits the facsimile out via a fax modem, which dials the destination and sends the fax.

Another technique receives a facsimile as an electronic image from the PSTN. And, rather than outputting the facsimile as a paper document to an output tray, an electronic fax service is utilized for delivery of the facsimile. An example of an electronic fax service is an internet fax service that allows users to receive fax messages via email. The user registers an email address with the service, which provides the user with a fax telephone number that originates at the service. When a fax is sent to the fax number, it arrives in an electronic format at a server, is converted to an email message by the service, and is sent to the email address registered by the user. Another internet technique embraces sending/receiving a fax via the internet by dynamically binding the sender and the receiver at the time of transmission through a service.

Another technique allows facsimile messages to be sent or received electronically to/from a computing device, which is typically referred to as PC-FAX. To send an electronic fax from a computing device to a multifunctional peripheral (MFP) with fax capabilities, a fax driver is used, such as a graphics device interface (GDI) fax driver. In this technique, the user opens the document to be faxed in the respective application and selects File→Print from the main application menu. From the print menu, the user selects the corresponding fax driver and specifies fax options. The application converts the document data into GDI data that is passed to the GDI fax driver, which converts the GDI data into a format compatible with the fax device. The fax data is then despooled to the MFP.

To receive an electronic fax at the computing device from an MFP with fax capabilities, a fax server process is used that runs on the computing device. The process runs continuously in the background and listens or polls for messages from the MFP. When a fax arrives at the MFP, the MFP connects to the fax server process and uploads the fax in a format compatible with the fax server process.

Thus, while techniques that enable information to be sent or received via facsimile currently exist, developers are continually attempting to improve the fax process for users, such as by making the fax process more efficient and/or convenient. Accordingly, it would be an improvement in the art to augment or even replace current techniques with other techniques.

SUMMARY OF THE INVENTION

The present invention relates to providing computer based printing, scanning and faxing. In particular, the present invention relates to systems and methods for describing a fax operation as a sequence of commands from a fax description language (FDL) forming a program unit, wherein the program unit may be constructed, transmitted and executed in a single operational step. The present invention further relates to systems and methods for configuring, sending and/or retrieving facsimile messages for fax jobs, wherein the fax job requests are sent through a print subsystem.

Implementation of the present invention takes place in association with a computer device. In at least some implementations, a user sends or retrieves a fax job utilizing an existing print subsystem. In particular, the user sends the fax configuration or fax job send or retrieve request as a print job.

Moreover, the construction of a complex fax request, destination specification, faxing, error handling, retry, image manipulation and transmission and retrieval of the fax image data may be performed as a single operational step. The specification and transmission of the fax operation steps are through a common mechanism and interface. The fax operation steps are constructed from a programming language and compiled into a program unit, which can be executed in whole, or part, independently. The program unit may be dynamically (i.e., independently of the construction of the program unit) partitioned between the MFP and the fax subsystem. Thus, the first system performs some subset of steps, deletes the executed steps and makes the appropriate substitutions and the remaining program unit is performed by the second system.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order that the manner in which the above recited and other features and advantages of the present invention are obtained, a more particular description of the invention will be rendered by reference to specific embodiments thereof, which are illustrated in the appended drawings. Understanding that the drawings depict only typical embodiments of the present invention and are not, therefore, to be considered as limiting the scope of the invention, the present invention will be described and explained with additional specificity and detail through the use of the accompanying drawings in which.

DETAILED DESCRIPTION OF THE INVENTION

The present invention relates to providing computer based printing, scanning and faxing. In particular, the present invention relates to systems and methods for describing a fax operation as a sequence of commands from a fax description language (FDL) forming a program unit, wherein the program unit may be constructed, transmitted and executed in a single operational step. The present invention further relates to systems and methods for configuring, sending and/or retrieving facsimile messages for fax jobs, wherein the fax job requests are sent through a print subsystem.

Embodiments of the present invention embrace the utilization of a computer device. In at least some embodiments, a user sends or retrieves a fax job utilizing an existing print subsystem. In particular, the user sends the fax configuration or fax job send or retrieve request as a print job.

Moreover, embodiments of the present invention embrace the construction of a complex fax request, destination specification, faxing, error handling, retry, image manipulation and transmission and retrieval of the fax image data that may be performed as a single operational step. The specification and transmission of the fax operation steps are through a common mechanism and interface. The fax operation steps are constructed from a programming language and compiled into a program unit, which can be executed in whole, or part, independently. The program unit may be dynamically (i.e., independently of the construction of the program unit) partitioned between the MFP and the fax subsystem. Thus, the first system performs a subset of steps, deletes the executed steps and makes the appropriate substitutions and the remaining program unit is performed by the second system.

The following disclosure of the present invention is grouped into three subheadings, namely "Exemplary Operating Environment," "Utilizing a Print Subsystem" and "Utilizing a Fax Description Language." The utilization of the subheadings is for convenience of the reader only and is not to be construed as limiting in any sense.

Exemplary Operating Environment

Figure 1:
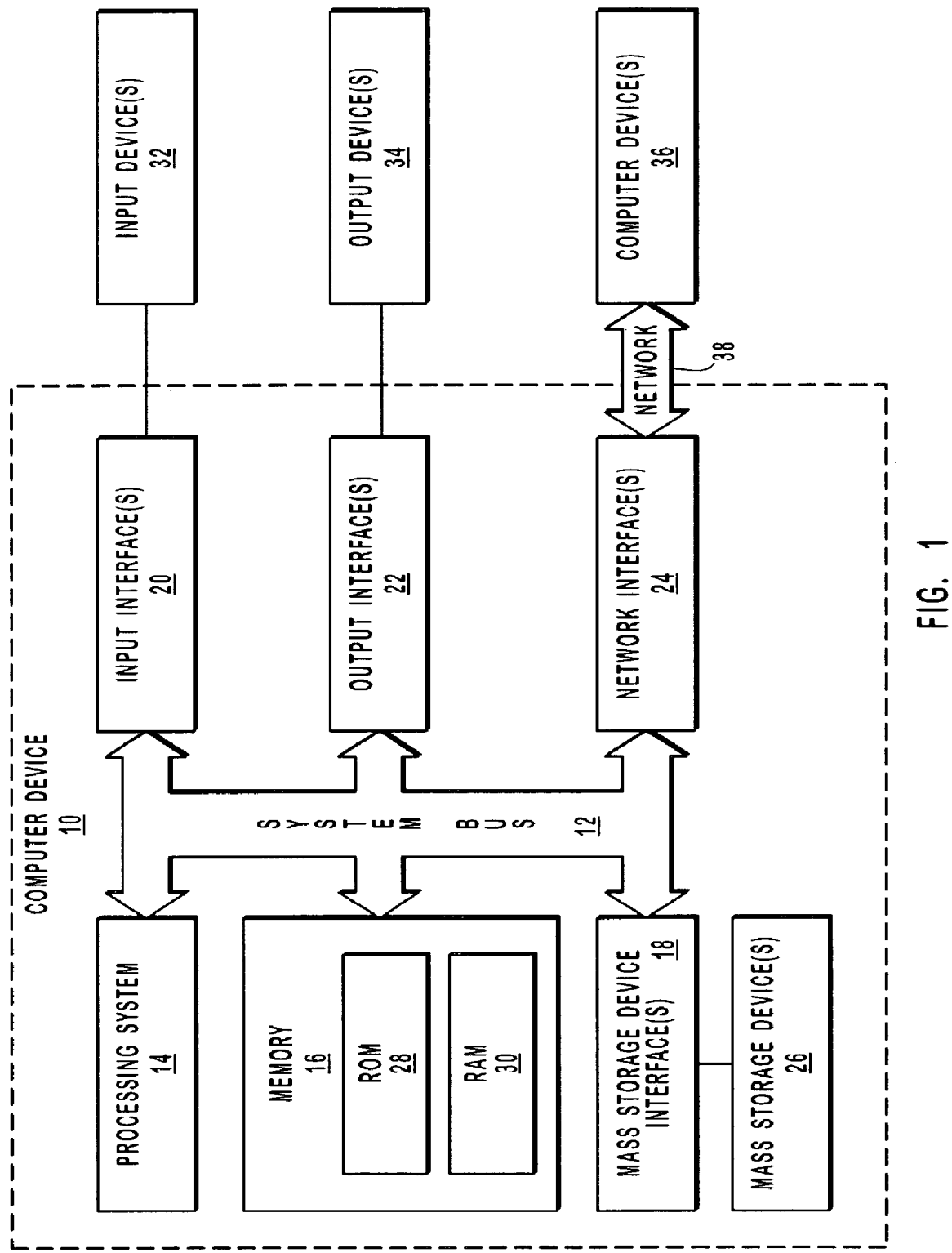
FIG. 1 illustrates a representative system that provides a suitable operating environment for use of the present invention.

FIG. 1 and the corresponding discussion are intended to provide a general description of a suitable operating environment in which the invention may be implemented. One skilled in the art will appreciate that the invention may be practiced by one or more computing devices and in a variety of system configurations, including in a networked configuration.

Embodiments of the present invention embrace one or more computer readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

With reference to FIG. 1, a representative system for implementing the invention includes computer device 10, which may be a general-purpose or special-purpose computer. For example, computer device 10 may be a personal computer, a notebook computer, a personal digital assistant ("PDA") or other hand-held device, a workstation, a minicomputer, a mainframe, a supercomputer, a multi-processor system, a network computer, a processor-based consumer electronic device, or the like.

Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer readable media, such as on memory 16, a magnetic hard disk, a removable magnetic disk, a magnetic cassette, an optical disk, or from a communication connection, which may also be viewed as a computer readable medium.

Memory 16 includes one or more computer readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include hard disk drives, magnetic disk drives, tape drives and optical disk drives. A mass storage device 26 may read from and/or write to a magnetic hard disk, a removable magnetic disk, a magnetic cassette, an optical disk, or another computer readable medium. Mass storage devices 26 and their corresponding computer readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard and alternate input devices, such as a mouse, trackball, light pen, stylus, or other pointing device, a microphone, a joystick, a game pad, a satellite dish, a scanner, a camcorder, a digital camera, and the like. Similarly, examples of input interfaces 20 that may be used to connect the input devices 32 to the system bus 12 include a serial port, a parallel port, a game port, a universal serial bus ("USB"), a firewire (IEEE 1394), or another interface.

One or more output interfaces 22 may be employed to connect one or more corresponding output devices 34 to system bus 12. Examples of output devices include a monitor or display screen, a speaker, a printer, and the like. A particular output device 34 may be integrated with or peripheral to computer device 10. Examples of output interfaces include a video adapter, an audio adapter, a parallel port, and the like.

One or more network interfaces 24 enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device. Furthermore, in a networked system computer device 10 may participate in a distributed computing environment, where functions or tasks are performed by a plurality of networked computer devices.

Those skilled in the art will appreciate that embodiments of the present invention embrace a variety of different system configurations. For example, in one embodiment the system configuration includes one or more multifunctional peripherals (MFP), one or more client computer devices, optionally a server computer device, and a network communication that enables sending a facsimile to/from a fax component of an MFP from/to the client computer device(s) using an existing print subsystem. In another embodiment, the system configuration includes one or more MFPs with a common interpreter that accepts a page description language (PDL) for printing a fax description language (FDL) for faxing, and that optionally accepts a scan description language (SDL) for scanning. The system configuration further includes one or more client computer devices, optionally a server computer device, and a mechanism for specifying and transmitting the fax operation steps as a single operational step and through the same common print subsystem.

Figure 2:
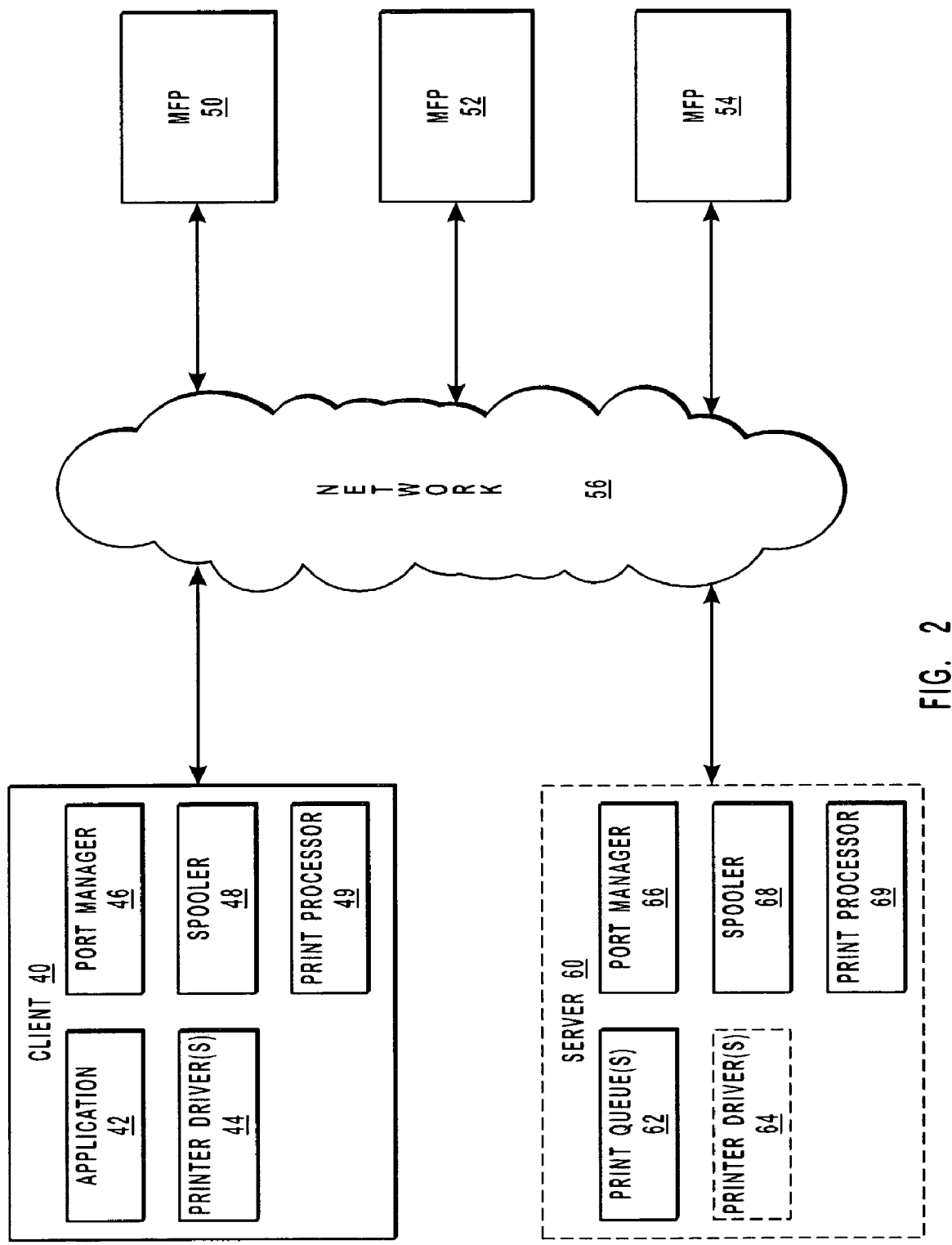
FIG. 2 illustrates a representative networked system configuration for use in association with the present invention.

Thus, while those skilled in the art will appreciate that embodiments of the present invention may be practiced in a variety of different environments with many types of computer system configurations, FIG. 2 provides a representative networked system configuration that may be used in association with the present invention. While FIG. 2 illustrates an embodiment that includes a client, three multifunctional peripherals (MFPs), and optionally a print server connected to a network, alternative embodiments include more than one client, less than three MFPs, more than three MFPs, no server, and/or more than one server connected to a network. Other embodiments of the present invention include local, networked, or peer-peer printing environments where one or more computer devices are connected to one or more printing devices. Moreover, embodiments in accordance with the present invention also include wireless networked environments, or where the network is a wide area network, such as the Internet.

The representative system of FIG. 2 includes a computer device, illustrated as client 40, which is connected to a plurality of peripheral devices (illustrated as MFP 50, MFP 52, and MFP 54) across network 56. In FIG. 2, MFPs 50-54 may be any type of device that may be used to render a fax job. In one embodiment, the capabilities of any one of the MFPs are heterogeneous to the capabilities of any other MFP (e.g., at least one of the capabilities of one printing device, such as MFP 50, are different from the capabilities of another MFP device, such as MFP 52). In another embodiment, the capabilities of the MFPs are homogeneous.

While printers 50-54 are connected to network 56, embodiments of the present invention embrace the use of peripheral devices (e.g., MFPs) that are locally connected to a computer device, that are configured in a peer-to-peer printing environment, or that are configured in a wireless network environment.

In the illustrated embodiment, client 40 includes a software application 42, one or more print drivers 44, a port manager 46, a spooler 48, and a print processor 49. A printer server 60 is optionally included having, for example, one or more print queues 62, one or more printer drivers 64, a port manager 66, a spooler 68, and a print processor 69.

Thus, in accordance with the illustrated embodiment and other embodiments of the present invention, computer based printing, scanning and faxing is provided. In particular, embodiments of the present invention relate to systems and methods for describing a fax operation as a sequence of commands from a fax description language (FDL) forming a program unit, wherein the program unit may be constructed, transmitted and executed in a single operational step, as will be further described below. Embodiments of the present invention further relate to systems and methods for configuring, sending and/or retrieving facsimile messages for fax jobs, wherein the fax job requests are sent through a print subsystem, which will also be further described below.

Utilizing a Print Subsystem

Figure 3:
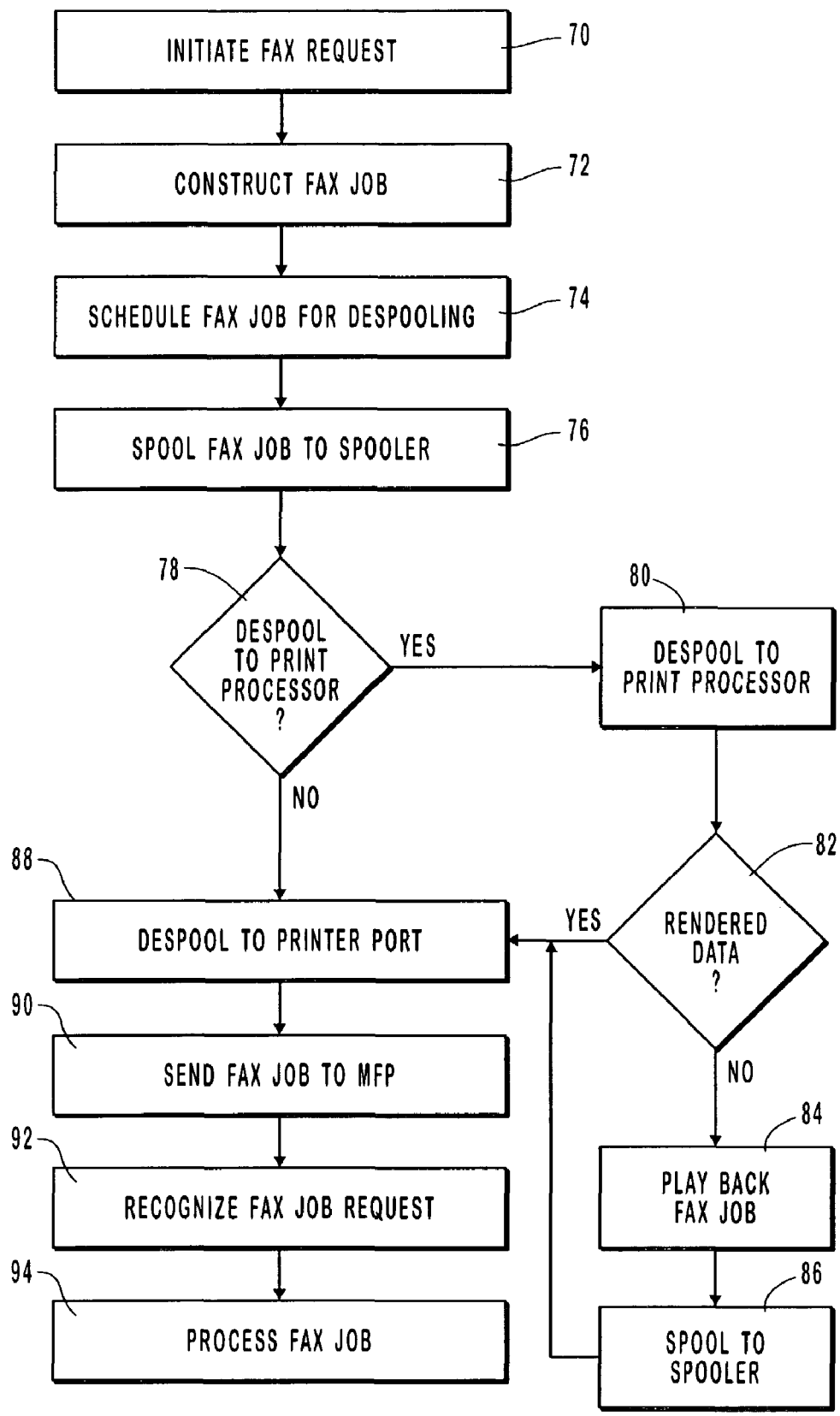
FIG. 3 illustrates a flow chart that provides a representative embodiment for processing a fax job utilizing a print subsystem.

As provided above, embodiments of the present invention relate to systems and methods for configuring, sending and/or retrieving facsimile messages for fax jobs, wherein the fax job requests are sent through a print subsystem. With reference now to FIG. 3, a flow chart is illustrated that provides a representative embodiment for processing a fax job utilizing a print subsystem.

In FIG. 3, a user initiates at step 70 a fax request from a client computing device to an MFP with fax capabilities. By way of example, the fax request may include (i) a sending configuration profile that is to be loaded into the MFP, (ii) configuration information from the MFP, (iii) a status of the MFP, fax component, and/or fax job, (iv) usage or accounting information from the MFP on the fax component, (v) fax related programs that are to be loaded into the MFP, (vi) a fax for transmission to a telephone number or other designated fax address, and/or (vii) a fax transmission that is spooled in storage from the MFP.

In the present embodiment, the fax request is initiated through a fax application. The fax application interacts with the user through a user interface, batch program, remote interface, or the like. The fax application constructs a fax job at step 72 in a format that is compatible with the fax component of an MFP device. At step 74, the fax job is scheduled with the spooler for despooling to the MFP device. By way of example, in an embodiment that embraces a Microsoft Windows® environment, the fax application instructs the spooler to schedule/despool a fax job to the MFP device by the following:

```
OpenPrinter ( &hPrinter, "My MFP", NULL); // Open Handle to
MFP Device
While (fax data)
{
WritePrinter ( hPrinter, data, size of data, number of bytes written );
}
ClosePrinter ( hPrinter );
```

As an example, if the fax component of the MFP device accepts the fax image data in a TIFF format and PJL statements for fax instructions, the fax job might look like:

```
Esc%12345X     # Universal Printer Exit Language
EscE           # Printer Reset
@PJL JOBTYPE=FAX
@PJL JOBDESTINATION=5036661212
@PJL ENTER LANGUAGE=TIFF
<TIFF IMAGE>
EscE           # Printer Reset
Esc%12345X     # Universal Printer Exit Language
```

Accordingly, the fax job is constructed at step 72, scheduled for despooling at step 74, and then is spooled to a spooler at step 76. A determination is then made at decision block 78 as to whether or not to despool the fax job to a print processor. If it is determined at decision block 78 that the fax job is to be despooled to a print processor, execution proceeds to step 80.

At step 80, the spooler despools the fax job to a print processor. A determination is then made at decision block 82 as to whether or not the fax job includes rendered data. If it is determined at decision block 82 that the fax job includes rendered data, the print processor despools the fax job to the associated printer port at step 88. Alternatively, if it is determined that the fax job does not include rendered data, the fax job at step 84 is played back to the MFP driver, which then renders the fax job into fax ready data and respools the fax job to the spooler at step 86. Execution then proceeds to step 88, where the fax job is despooled to the printer port.

With reference back to decision block 78, if it is determined that the fax job will not be despooled to the print processor, execution proceeds directly to step 88, wherein the fax job is despooled to the printer port associated with the MFP device. In the present embodiment, the printer port is designated by installing the MFP as a local or network printer on the client computing device. In the Microsoft Windows® family of operating systems, the MFP device appears in the printer's folder.

At step 90, the fax job is sent to the MFP using the printing protocol associated with the printer port. Representative printing protocol includes: (i) Bi-Di communication on IEEE 1284 Parallel Port, (ii) LPR, (iii) TCP/IP, (iv) Port9100, (v) IPP, or another protocol. Depending on the capabilities of the MFP, the fax job sent to the MFP is either queued. (i.e., multi-job MFP) or serially processed (i.e., single job MFP).

When the MFP processes the fax job, the MFP firmware interpreter recognizes the job request as a fax job request at step 92 and performs the corresponding appropriate action to process the fax job at step 94.

Figure 4:
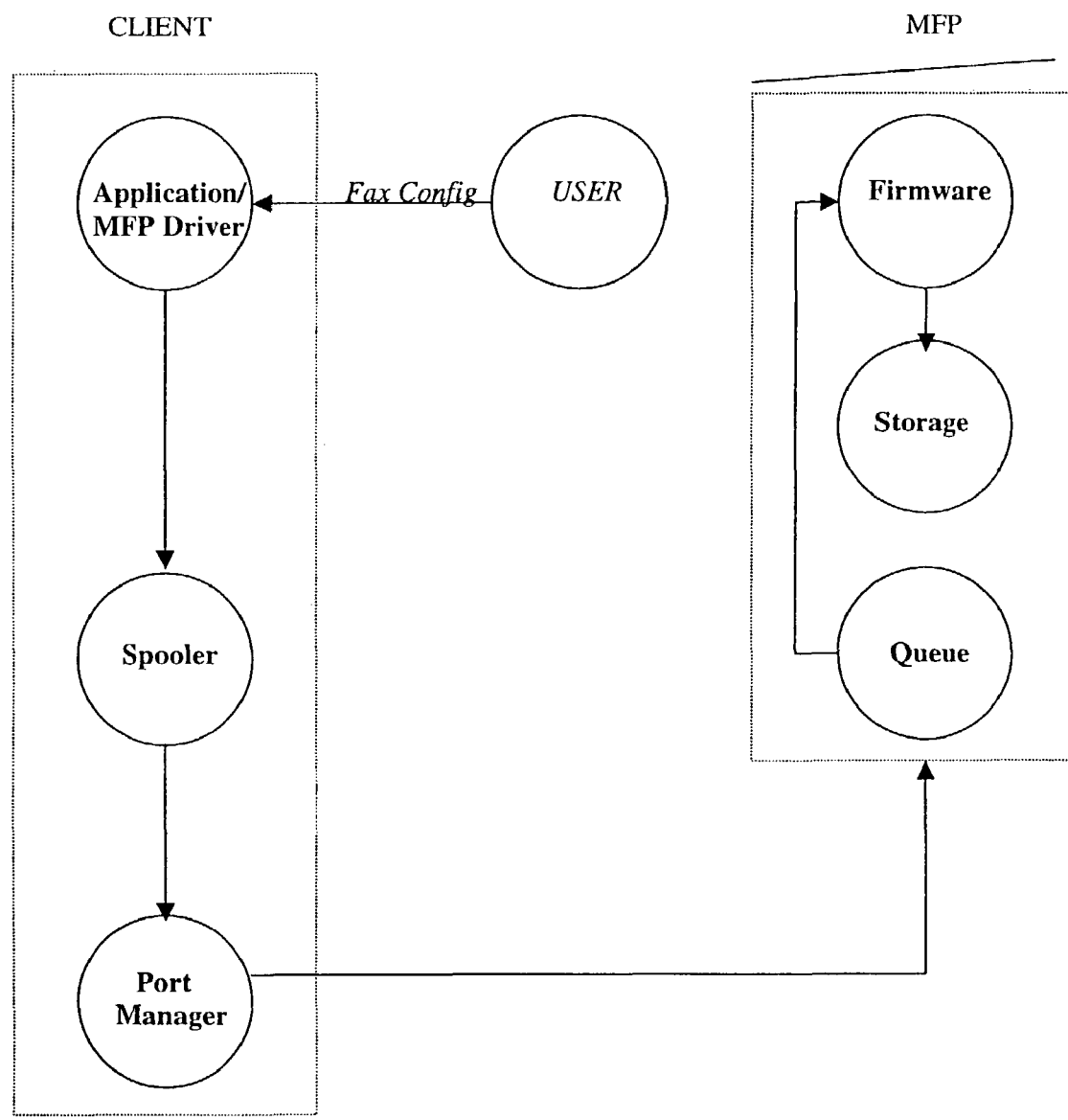
FIG. 4 illustrates a representative embodiment for providing a send fax configuration.
Figure 5:
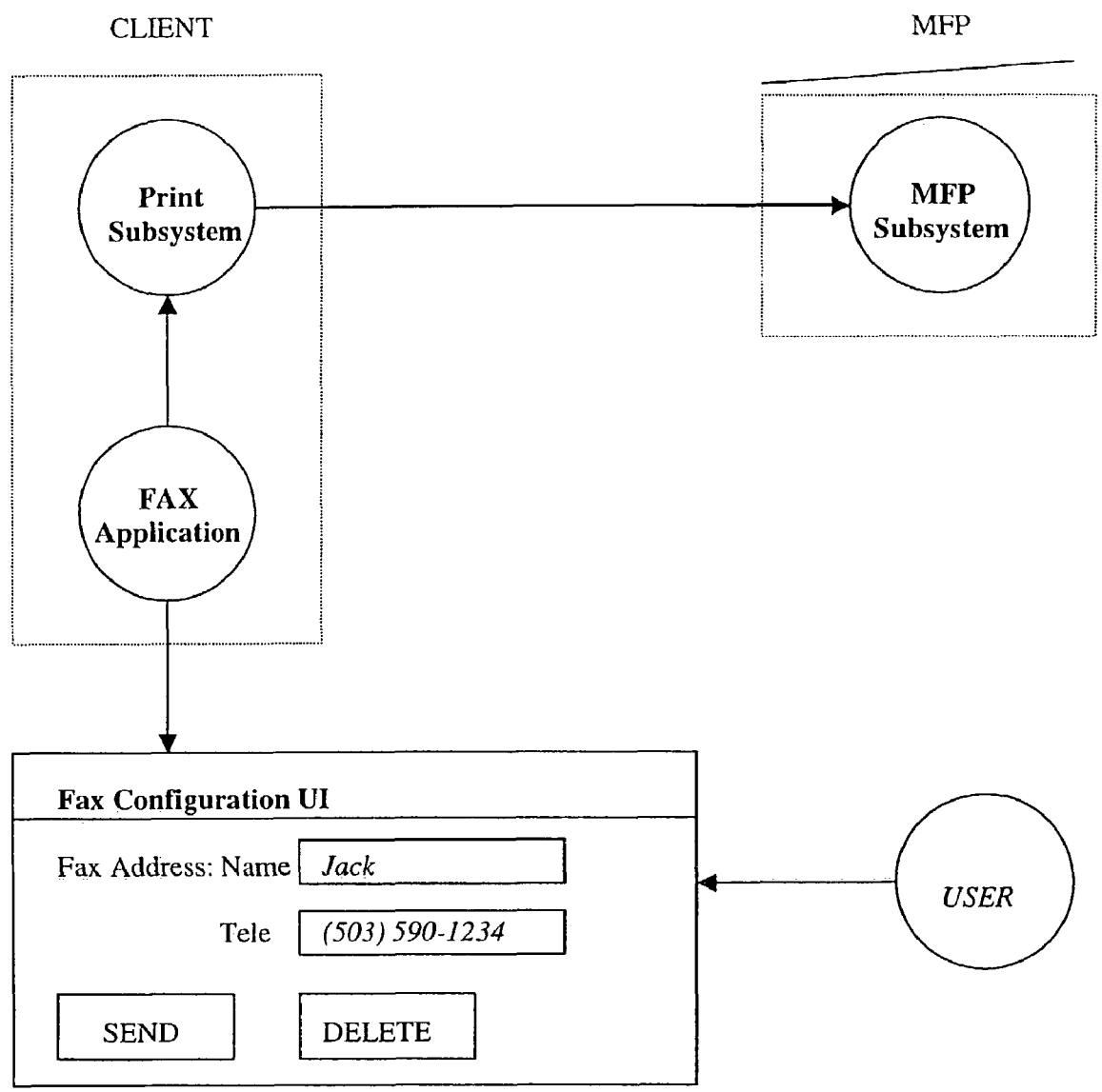
FIG. 5 illustrates a representative embodiment for providing a send fax configuration, utilizing an application interface.

In at least some embodiments, the fax job appears as a print job, but relates to the performance of an action other than printing, namely an action relating to faxing. Accordingly, the fax job can be referred to as a "pseudo print job." FIGS. 4 and 5 are representative system configurations of the embodiment illustrated in FIG. 3. FIG. 4 illustrates a representative embodiment for providing a send fax configuration (e.g., address book) as a pseudo print job. In FIG. 4, the fax configuration/settings are sent as a pseudo print job and an existing print subsystem is utilized. FIG. 5 illustrates a representative embodiment for providing a send fax configuration (e.g., address book) as a pseudo print job, utilizing an application interface.

With reference back to FIG. 3, in another embodiment, the fax request is initiated at step 70 through the MFP Driver. The MFP driver combines the print, scan and fax functions of the MFP device, or any other combination thereof. By way of example, to specify a fax job request to the selected MFP(s), the user (i) invokes the MFP driver (e.g., right clicks on MFP driver in printer's folder), (ii) locates the faxing portion of the MFP driver (e.g., selects properties and then selects the fax tab), (iii) specifies the fax option for the fax job request, (iv) specifies any additional fax options, (v) selects "OK" to send the fax job request. The MFP driver then constructs the fax job at step 72 and spools the fax job to the spooler, which then despools the fax job to the printer port.

Figure 6:
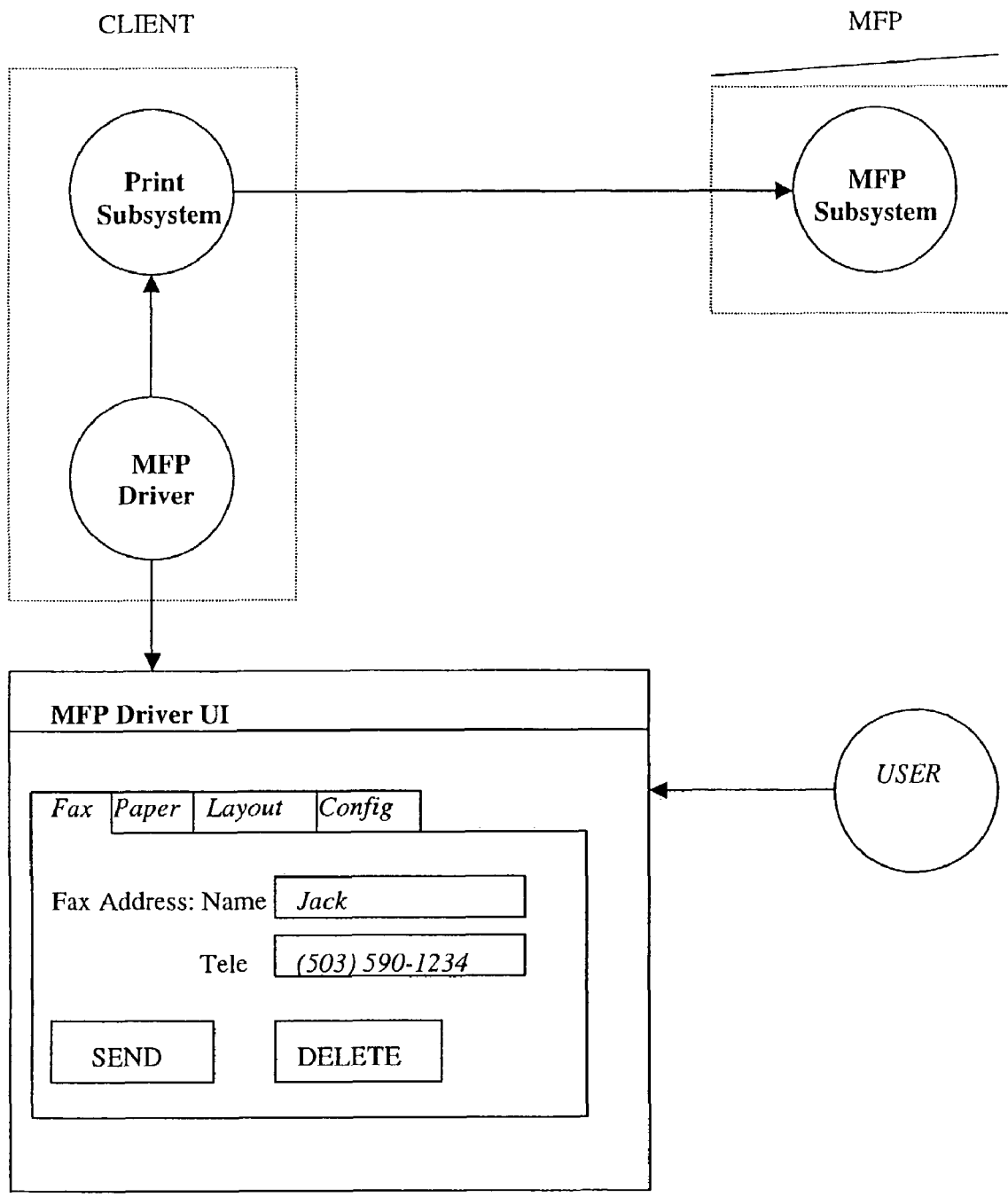
FIG. 6 illustrates a representative embodiment for providing a send fax configuration, utilizing an MFP driver interface.

Representative configurations of this embodiment are provided as FIGS. 4 and 6. As provided above, FIG. 4 illustrates a representative embodiment for providing a send fax configuration (e.g., address book) as a pseudo print job. In FIG. 4, the fax configuration/settings are sent as a print job and an existing print subsystem is utilized. FIG. 6 illustrates a representative embodiment for providing a send fax configuration (e.g., address book) as a pseudo print job, utilizing an MFP driver interface.

Figure 7:
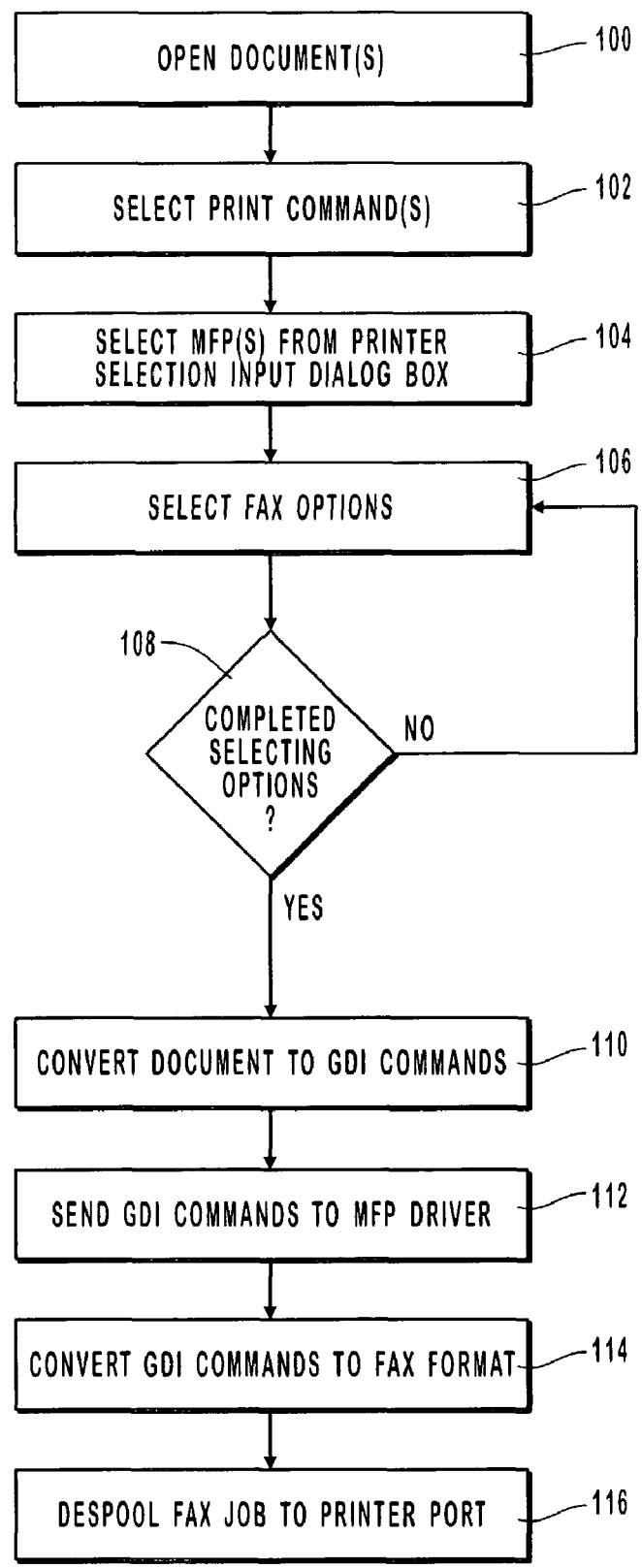
FIG. 7 illustrates a representative embodiment for providing a fax job request via a graphical device interface in accordance with the present invention.

In another embodiment, and with reference to FIG. 7, a document is faxed by opening the document at step 100 via an associated application and selecting the print commands (e.g., File→Print) at step 102 Print from the application menu. The MFP device is selected from the printer selection input dialog box at step 104. At step 106, the user selects the properties pages for the MFP device to select fax options specific to the job and the device. A determination is then made at decision block 108 as to whether or not the selections have been completed. If the selections have not been completed, execution returns back to step 106 until the selection of options has been completed.

Thus, once the user has finished selecting the appropriate options and enters "OK" to send the fax, the application converts the document to graphical device interface (GDI) commands at step 110. The GDI commands are then sent to the MFP driver at step 112, which converts the GDI commands to a fax format at step 114 that is compatible with the fax component of the MFP device and spools the fax job to the spooler. The spooler then despools the fax job at step 116 to the printer port associated with the MFP device.

Figure 8:
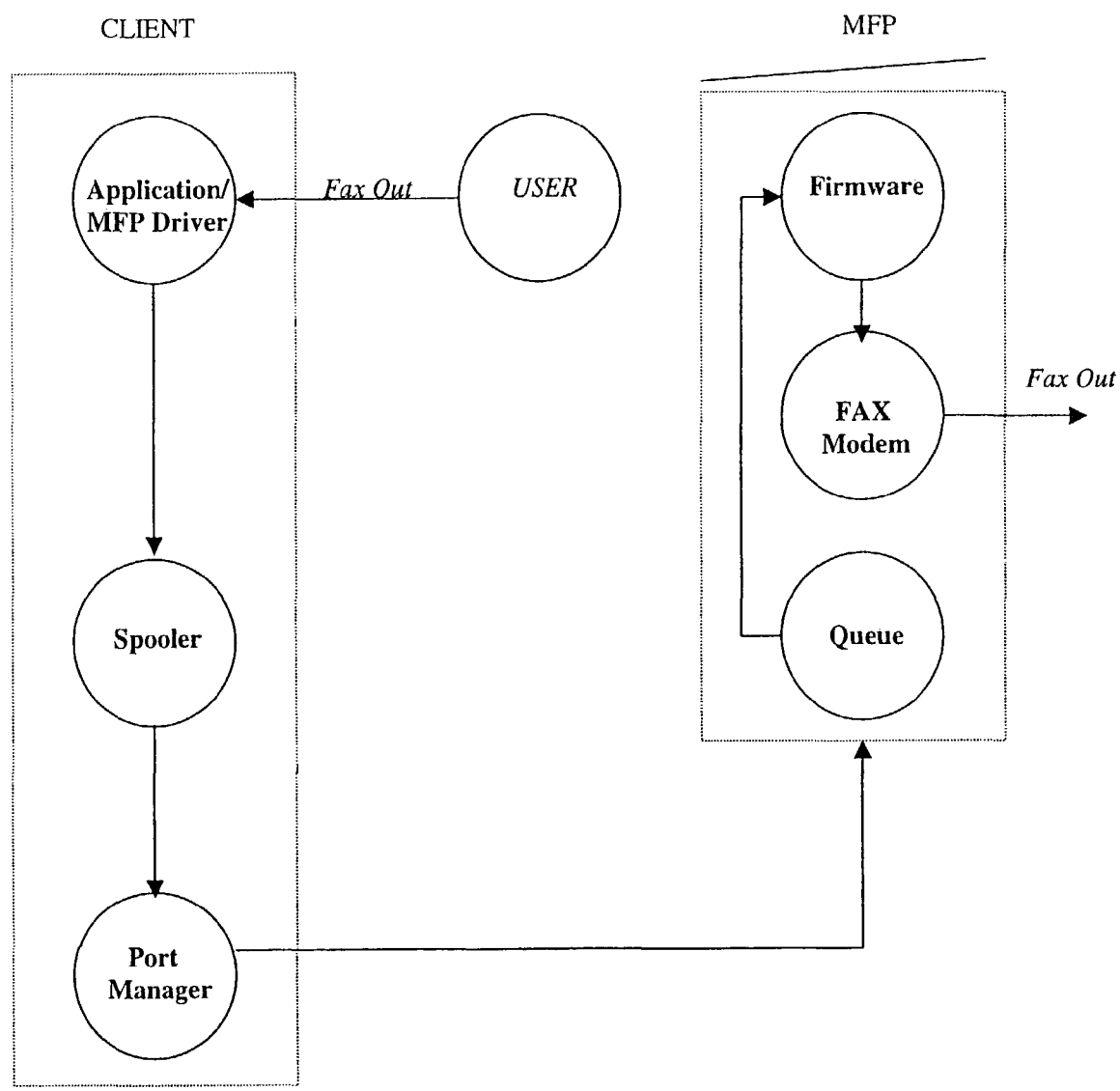
FIG. 8 illustrates another representative embodiment for providing a send fax configuration.

With reference now to FIG. 8, a representative embodiment is provided for transmitting a fax in accordance with the present invention. In FIG. 8, a user interacts with a fax application and/or an MFP driver, and specifies a document to fax, one or more fax address and any other fax options. The fax job is then constructed in a format compatible with the fax component of the MFP device and spooled to the spooler. The spooler then despools the fax job to the printer port associated with the MFP device. The MFP device interprets the fax job as a fax transmission, interprets any options, converts the fax data into a facsimile message, and sends it to one or more destinations, immediately or delayed, depending on the options.

The MFP device sends the facsimile transmission to the destinations through a PSTN, via the internet, via email or any other fax transmission method. Further, the MFP driver fax output may be in a fax format when there is not fax image processing capability in the MFP. Alternatively, the MFP driver fax output may be in a PDL format when a fax image processing capability is in the MFP. Other embodiments embrace a PDL format when the fax image capability processing is at the destination or at another point in the system or chain.

Figure 9:
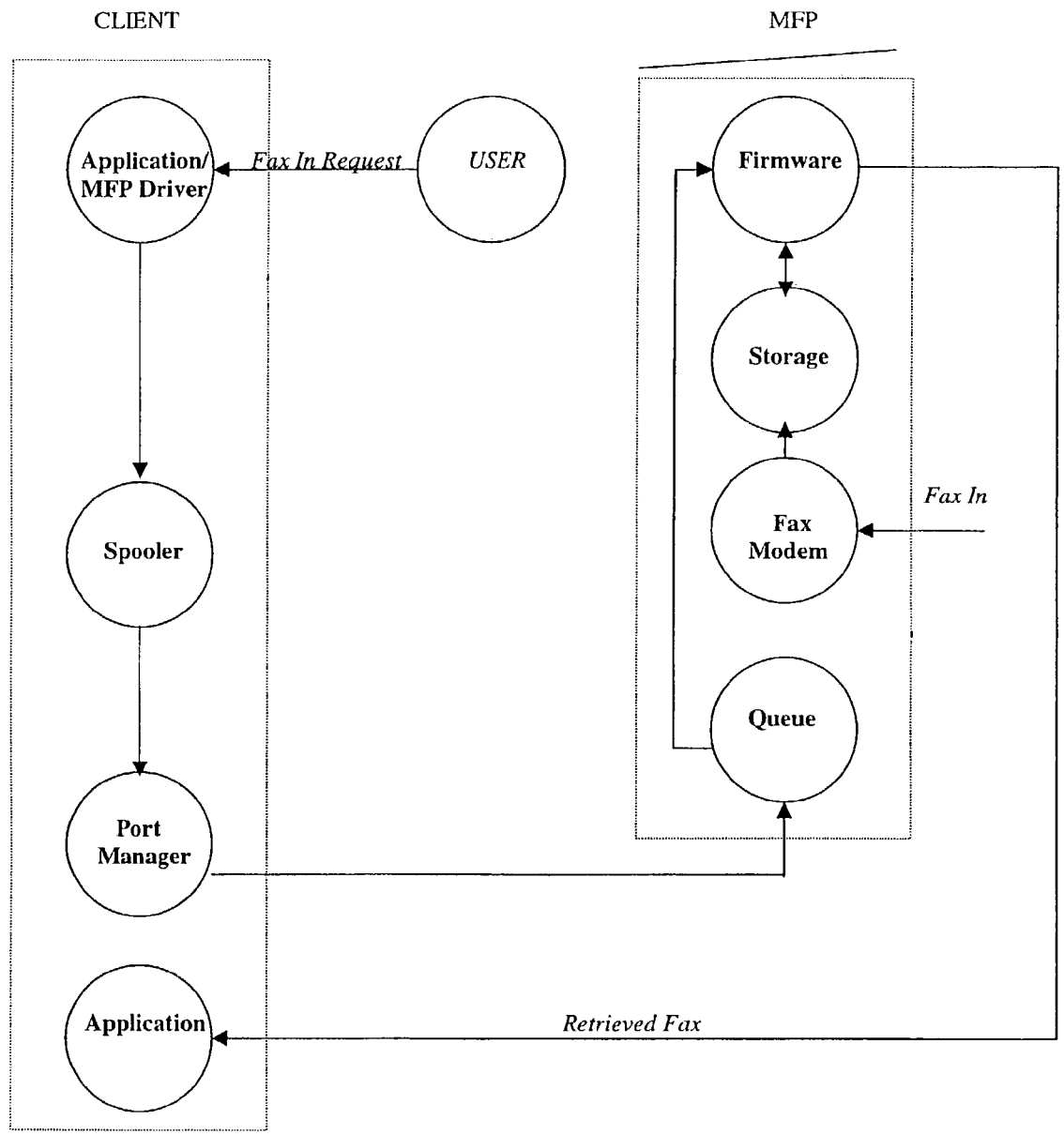
FIG. 9 illustrates a representative embodiment for providing a retrieve spooled fax configuration.

With reference now to FIG. 9, a representative embodiment for providing a retrieve spooled fax configuration is illustrated. In FIG. 9, a user interacts with a fax application, and/or an MFP driver, and specifies one or more spooled faxes, fax sources, or other identifying criteria to retrieve from the device. A spooled fax is a received fax that the MFP device has spooled to storage and has not yet delivered to the end destination or is spooled at another location (e.g., source) of which the MFP has been notified. In at least one embodiment where a received fax is spooled at another location (e.g., source), the MFP pulls the fax from where it is spooled.

The fax job is constructed in a format compatible with the fax component of the MFP device and spooled to the spooler. The spooler then despools the fax job to the printer port associated with the MFP device. The MFP device interprets the fax job as a fax retrieval, interprets any options, optionally converts the facsimile message into a format compatible with the receiving process at the client computing side, connects with a process at the client computing device (e.g., FTP, TCP/IP) and sends it to the client computing device.

In other configurations, the fax job request instructs the MFP device where to deliver future facsimile messages (i.e., automatic fax in) versus spooling the facsimile message (i.e., interactive fax in).

While embodiments of the present invention embrace spooling and despooling subsystems of the Microsoft Windows® operating systems, other embodiments embrace spooling and despooling subsystems of the Apple Macintosh® operating system, Linux® operating system, System V Unix® operating systems, BSD Unixg operating systems, OSF Unix® operating systems, Sun Solaris® operating systems, HP/UX® operating systems, IBM® Mainframe MVS operating systems (OS/390), AS/400, etc.

Utilizing a Fax Description Language

As provided above, at least some embodiments of the present invention embrace utilizing a fax description language to process fax jobs. Accordingly, embodiments embrace constructing a fax request, destination specification, error handling, retry, faxing, image manipulation and transmission and retrieval of the fax image data as described herein, which is independent of a method to initiate the faxing in/out of the document and the transmission/retrieval of the fax image data back to the destination.

Figure 10:
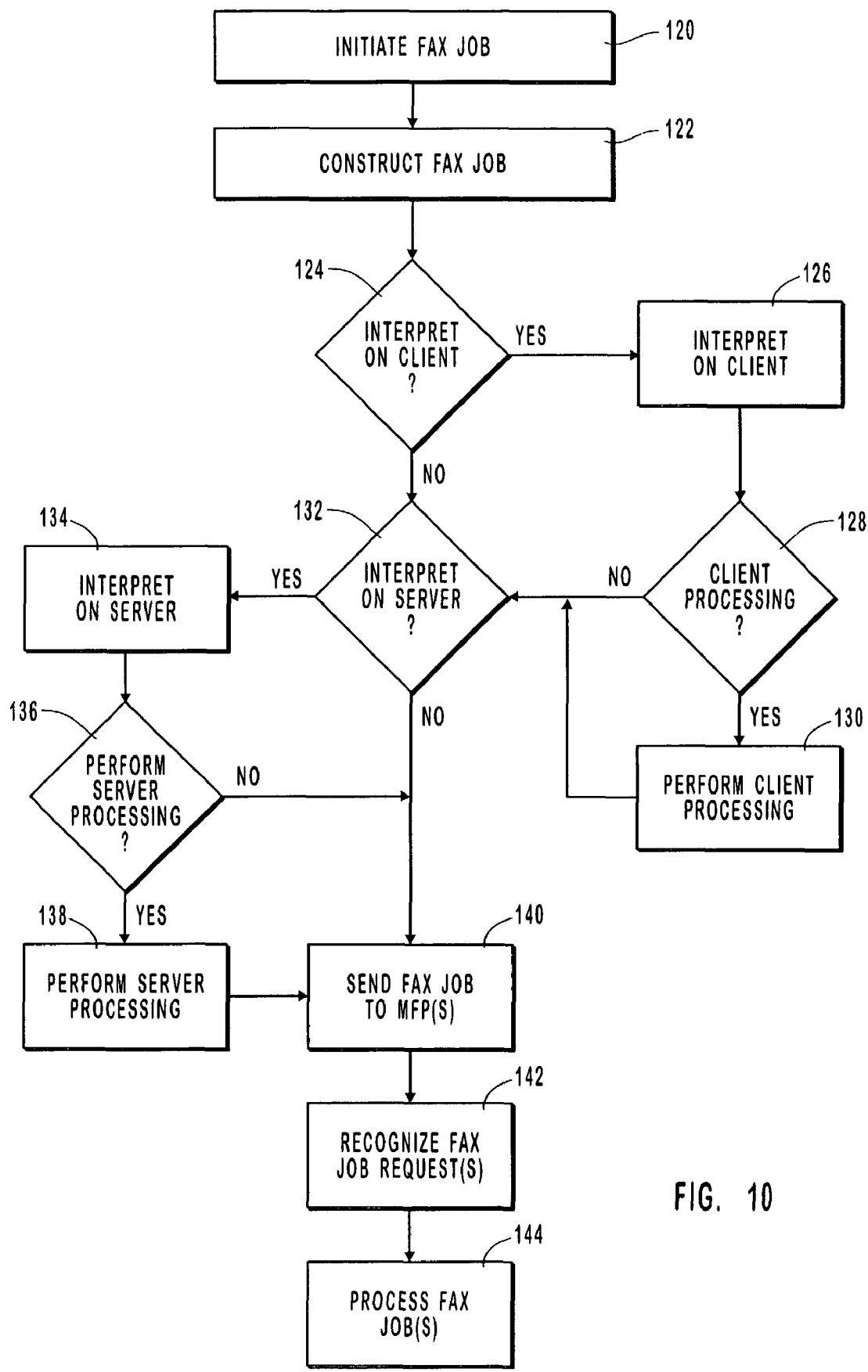
FIG. 10 illustrates a representative embodiment for utilizing a fax description language in accordance with embodiments of the present invention.

With reference to FIG. 10, a representative embodiment is provided for utilizing a fax description language in accordance with embodiments of the present invention. A fax job may be initiated by a user at an MFP front panel, from an application, from the client, from a third-party component (e.g., a server), or from another source. Likewise, the fax image data may be pushed to the destination by the MFP, or pulled from the MFP by the destination, or scheduled and sent by a server device. In FIG. 10, a user initiates a network fax job for transmission from the client computing device at step 120. In another embodiment, the user initiates the fax job for transmission from the front panel of the MFP. The user initiates the network fax job via any of a variety of manners, such as by (i) a network fax enabled application, (ii) a printer/scanner/fax driver (MFP driver), or (iii) another manner.

In at least one embodiment, the user selects one or more MFPs, which may be selected in a variety of manners, including by a pre-selection process, an auto-discovery process, a best-fit process, by manual input, etc. The user then selects various fax options, such as options relating to a physical scan or electronic image (e.g., resolution, cropping, output format, a compression method, etc.), options relating to the destination (e.g., fax telephone number(s), email address(es), IP or other network address(es), address book, user name or other unique identifier, service provider, etc.), options relating to transmission (e.g., batch mode, time period to send, number of retries, error handling, confirmation, delivery mode, etc.), options relating to sheet assembly (e.g., cover page, N-up, duplex, booklet, paper size, paper type, etc.), options relating to image manipulation (e.g., rotation, negative, mirror image, zoom, fit to size, color adjustment, etc.), options relating to the sender (e.g., sender identification, sender fax, etc.), and/or other similar options.

The user then initiates the fax transmission, typically by selecting an "OK" button.

The fax subsystem on the client computing device (e.g., MFP driver) then constructs a fax job as a sequence of commands from a fax description language (FDL), as indicated by step 122 of FIG. 10. The following is an example of an FDL sequence of commands:

```
UEL
@FDL SET DESTINATION1=<destination1>
@FDL SET RECIPIENT1=<recipient1>
@FDL SET DESTINATION2=<destination2>
@FDL SET RECIPIENT2=<recipient2>
@FDL SET DELIVERY=EMAIL
@FDL SET CONFIRMATION=YES
@FDL SET FROM=<sender>
@FDL SET RESPOND=<sender_destination>
@FDLSET RETRY=3
@FDL SET RESOLUTION=600
@FDL SET FORMAT=TIFF
@FDL SET COMPRESSION=G3
@FDL SET DUPLEX=ON
@FDL SET PAPER=LETTER
@FDL FAXDATA=START
<FAX DATA>
UEL
```

In the present example, an FDL sequence of commands is constructed to send a copy of the fax to two destinations, utilize email as a preferred delivery at the destination, confirm transmission, provide an auto-respond to the sender upon delivery (e.g., paper out or email received), retry transmission and delivery up to 3 times, send the transmission in TIFF format using G3 compression, and print the document in duplex mode on letter size paper.

Accordingly, once the user initiates the network fax job (step 120) and the fax job is constructed (step 122), a determination is made at decision block 124 as to whether or not some of the FDL sequence of commands are to be interpreted on the client. If it is determined that at least some of the FDL sequence of commands are to be interpreted and executed on the client computing device, such as by a fax driver or other fax process/application, it is performed at step 126. By way of example, the fax driver/application may detect that the MFP does not have multiple destination capabilities. Accordingly, the fax driver may convert the FDL into two fax spool files, one per destination. The fax driver/application may also perform some of the image operations, such as the format conversion, resolution and compression. Any FDL statements that are interpreted/executed prior to the MFP are then removed from the spool file.

Thus, at decision block 128 a determination is made as to whether or not any client processing is to be performed. If it is determined at decision block 128 that client processing is to be performed, execution proceeds to step 130 and then to decision block 132. Alternatively, if it is determined at decision block 128 that client processing is not to be performed, execution proceeds directly to decision block 132.

With reference back to decision block 124, if it is determined none of the FDL sequence of commands are to be interpreted on the client, execution proceeds directly to decision block 132.

If the spool path also includes a server computing device (e.g., fax server), the server computing device may also interpret and/or execute at least some of the FDL statements. Accordingly, at decision block 132 a determination is made as to whether or not some of the FDL sequence of commands are to be interpreted on the server. If it is determined at decision block 134 that some of the FDL sequence of commands are to be interpreted on the server, the interpretation is preformed at step 134. At decision block 136, a determination is made as to whether to perform server processing. The server processing is performed at step 138, any FDL statements that have been interpreted/executed are removed, and execution proceeds to step 140. Alternatively, if no server processing is to be performed, execution proceeds directly to step 140.

Returning back to decision block 132, if it is determined that none of the FDL sequence of commands are to be interpreted on the server, execution proceeds directly to step 140.

Accordingly, the FDL spool file is transmitted from the client computing device to the MFP. The FDL spool file may be transmitted directly to the MFP or via a 3rd party, such as a server computing device, as indicated at step 140. The method of transmission may be the print subsystem or another method.

The MFP device then interprets some or all of the MFP statements at step 142. For example, the MFP may process the transmission of the fax data to multiple recipients, error handling and the number of retries. Some of the FDL statements may not be interpreted by the MFP and passed along to the destination device. For example, the delivery mode, sheet assembly and confirmation instructions would typically be sent to the destination device. Accordingly, at step 144, the fax job is processed.

Figure 11:
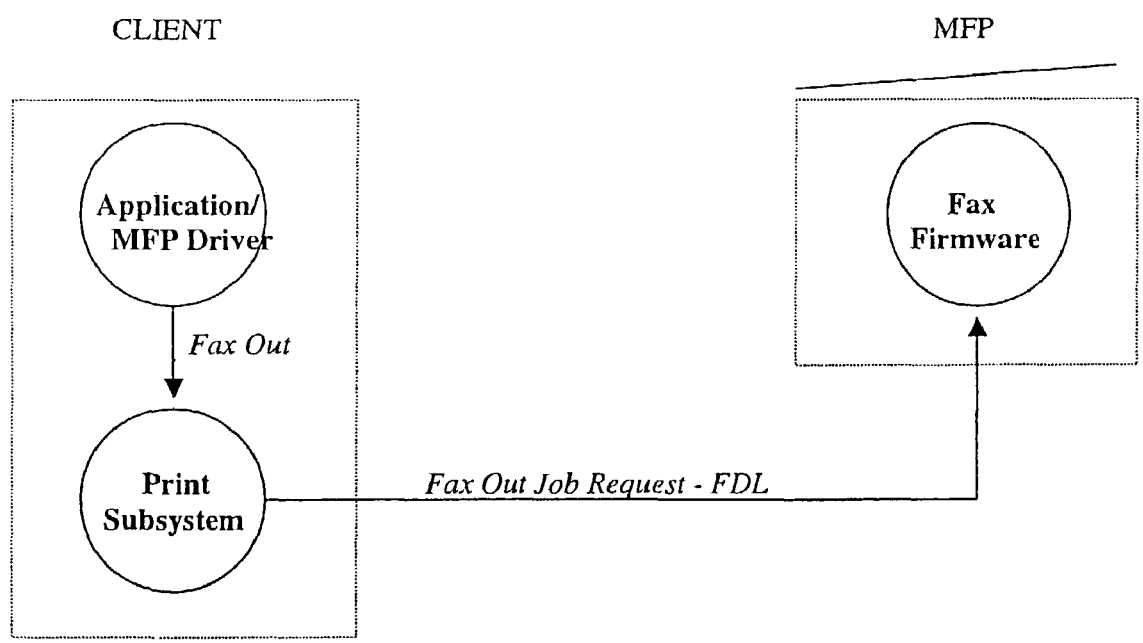
FIG. 11 illustrates a representative embodiment for providing a fax out request via a print subsystem utilizing a fax description language.
Figure 12:
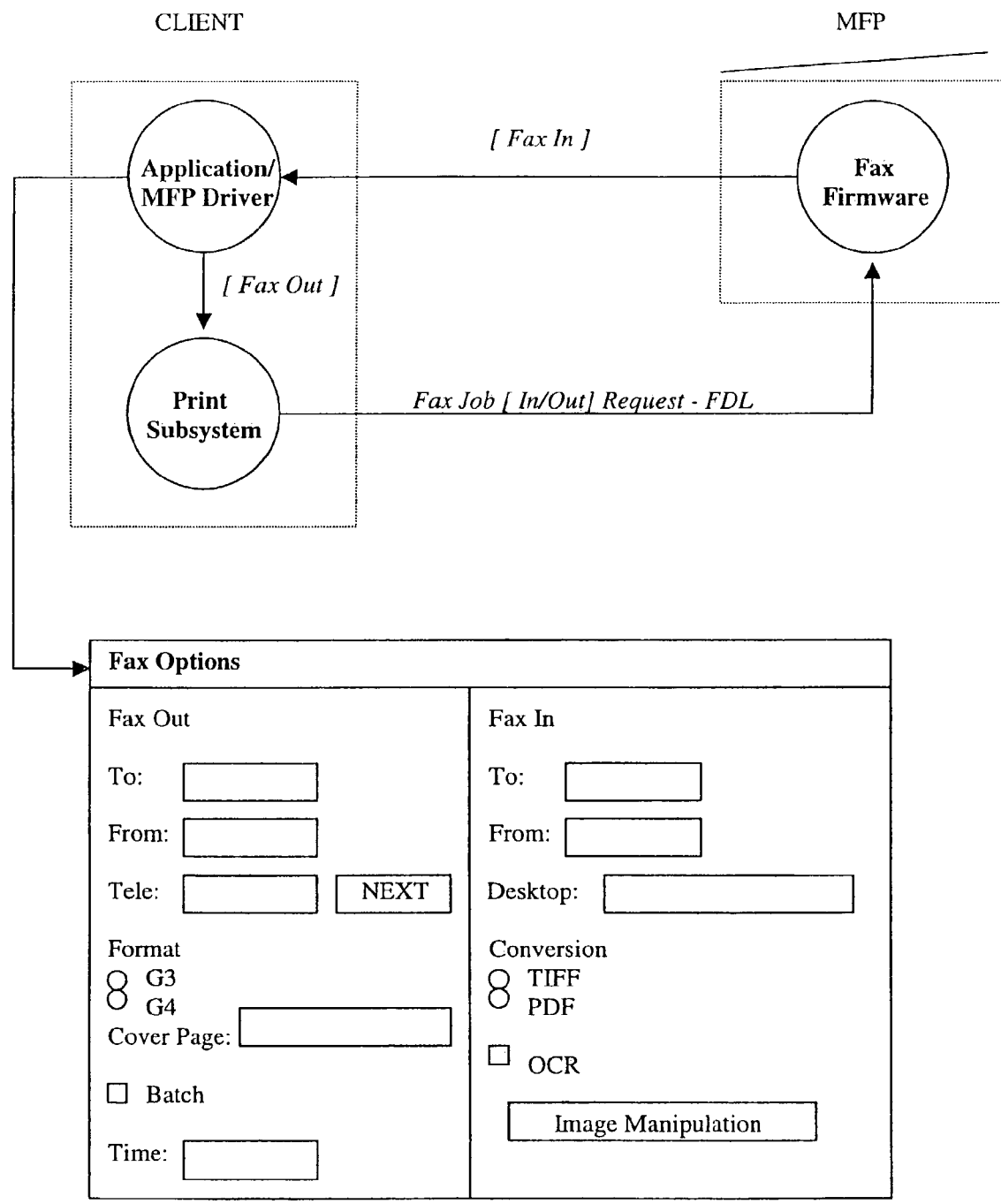
FIG. 12 illustrates a representative embodiment for providing a fax job request via a print subsystem utilizing a fax description language and a user interface at a client.

With reference now to FIGS. 11 and 12, representative configurations are provided as examples of the embodiment illustrated in FIG. 10. In particular, FIG. 11 illustrates a representative embodiment for providing a fax out request via a print subsystem utilizing a fax description language. FIG. 12 illustrates a representative embodiment for providing a fax job request via a print subsystem utilizing a fax description language and a user interface at a client.

Figure 13:
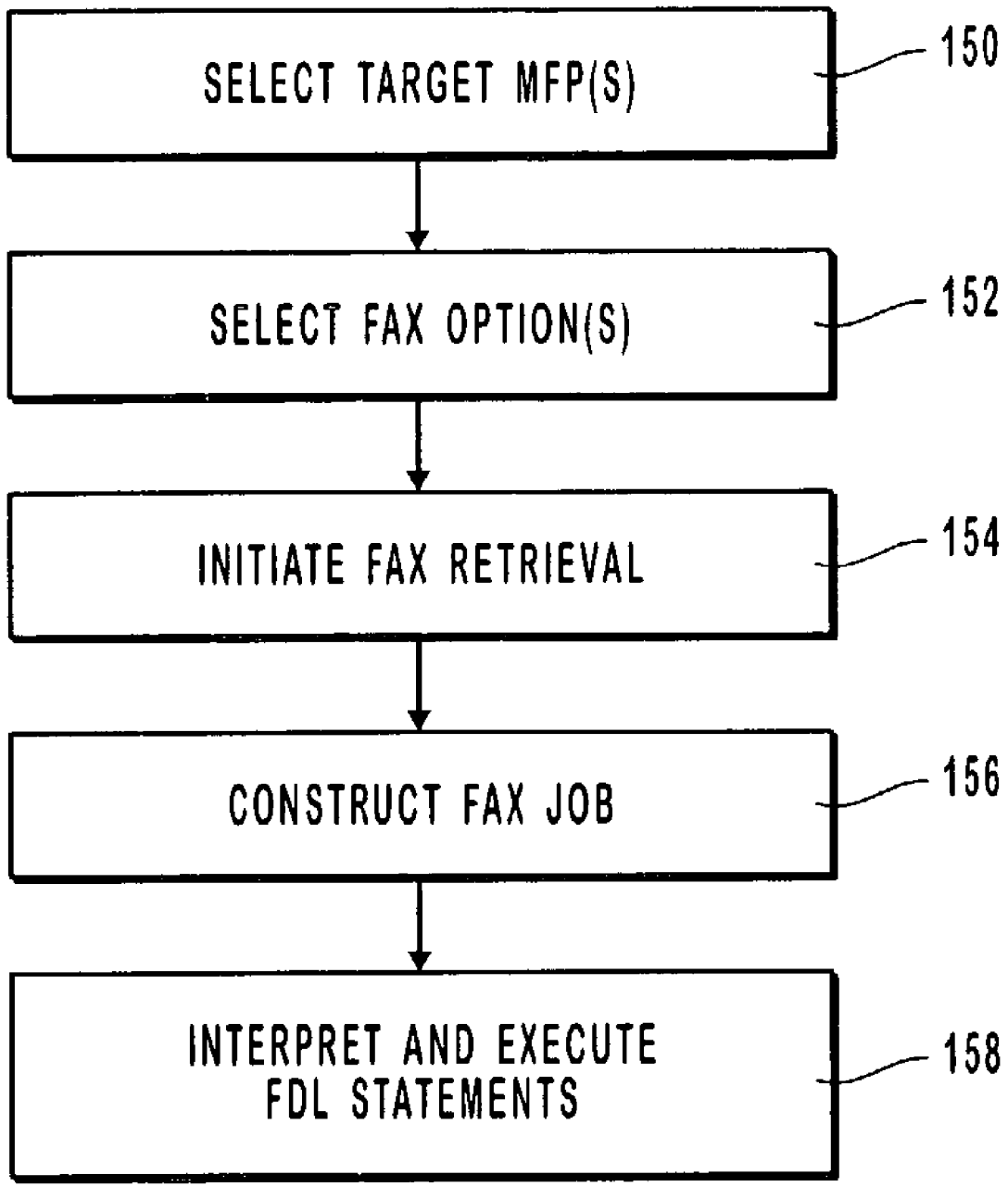
FIG. 13 illustrates a representative embodiment for providing a fax in request.

With reference now to FIG. 13, a representative embodiment is illustrated for providing a fax in request. In one embodiment, the user initiates a network fax job for retrieval or reception from the client computing device. In another embodiment, the user initiates the fax job for retrieval/reception from the front panel of the MFP. In at least some embodiments, retrieval implies that the fax has arrived at the destination and is spooled, such as to disk or in memory. Further, in at least some embodiments, reception implies that the fax has not arrived and some sequence of commands are executed to pull the fax from the sender or instruct the sender to push the fax.

Accordingly, the user or an application initiates the network fax job. The user or application selects one or more targeted MFPs at step 150 by any of a variety of manners discussed above. One or more of the various fax options may be selected at step 152, which may include options that are unique to fax in versus fax out. Examples of options include options relating to segmentation (e.g., OCR, font replacement, filtering, vector/bitmap enhancements, etc.) or other options.

At step 154, the fax retrieval is initiated, such as by having the user select an "OK" button. The fax subsystem on the client computing device (e.g., MFP driver) then constructs a fax job as a sequence of commands from a fax description language (FDL) at step 156. At step 158, the receiving MFP, client and/or server computing device then interprets and executes some or all of the remaining FDL statements. For example, if the fax is received at an MFP and contains an FDL statement for delivery mode to email, the MFP attempts to cross reference the recipient with an email address. Thus, the MFP deletes the corresponding FDL statements and route to the recipient via the recipient's email address.

Embodiments of the present invention embrace the fact that the FDL statements from the fax retrieval request may be interpreted/executed by the MFP and the remainder, if any, merged with the FDL statements from the received fax.

The fax driver/application receiving the fax on the recipient's client computing device may further process the FDL statements. Thus, for example, the fax driver/application may send a message back to the sender that the fax was delivered (e.g., via email or fax delivery report sent via fax), and image processing, such as optical character recognition (OCR).

Any remaining FDL statements are embedded with the fax, but in such a manner so as to not interfere with the viewing or other processing of the received document. Such alternate methods of storage of the remaining FDL statements, which could then be later picked up again, may include, but not limited to: (i) FDL statements in plain text on an appended page; (ii) FDL statements in barcode format in page margin area; and (iii) FDL statements as metadata within the image data (e.g., comments).

The remaining FDL statements are later recognized and interpreted/executed by other related fax processes. For example, if the document is then printed by the MFP and contains sheet assembly instructions (e.g., duplex and paper size) these FDL statements are executed when the document is printed.

Figure 14:
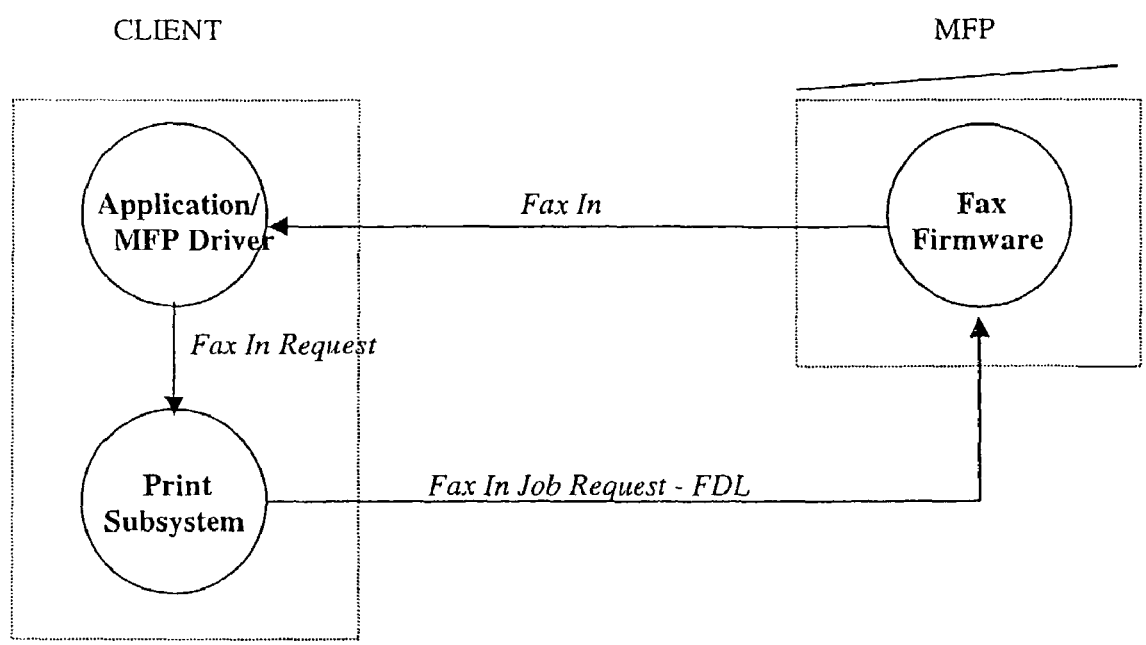
FIG. 14 illustrates a representative embodiment for providing a fax in request via a print subsystem utilizing a fax description language.
Figure 15:
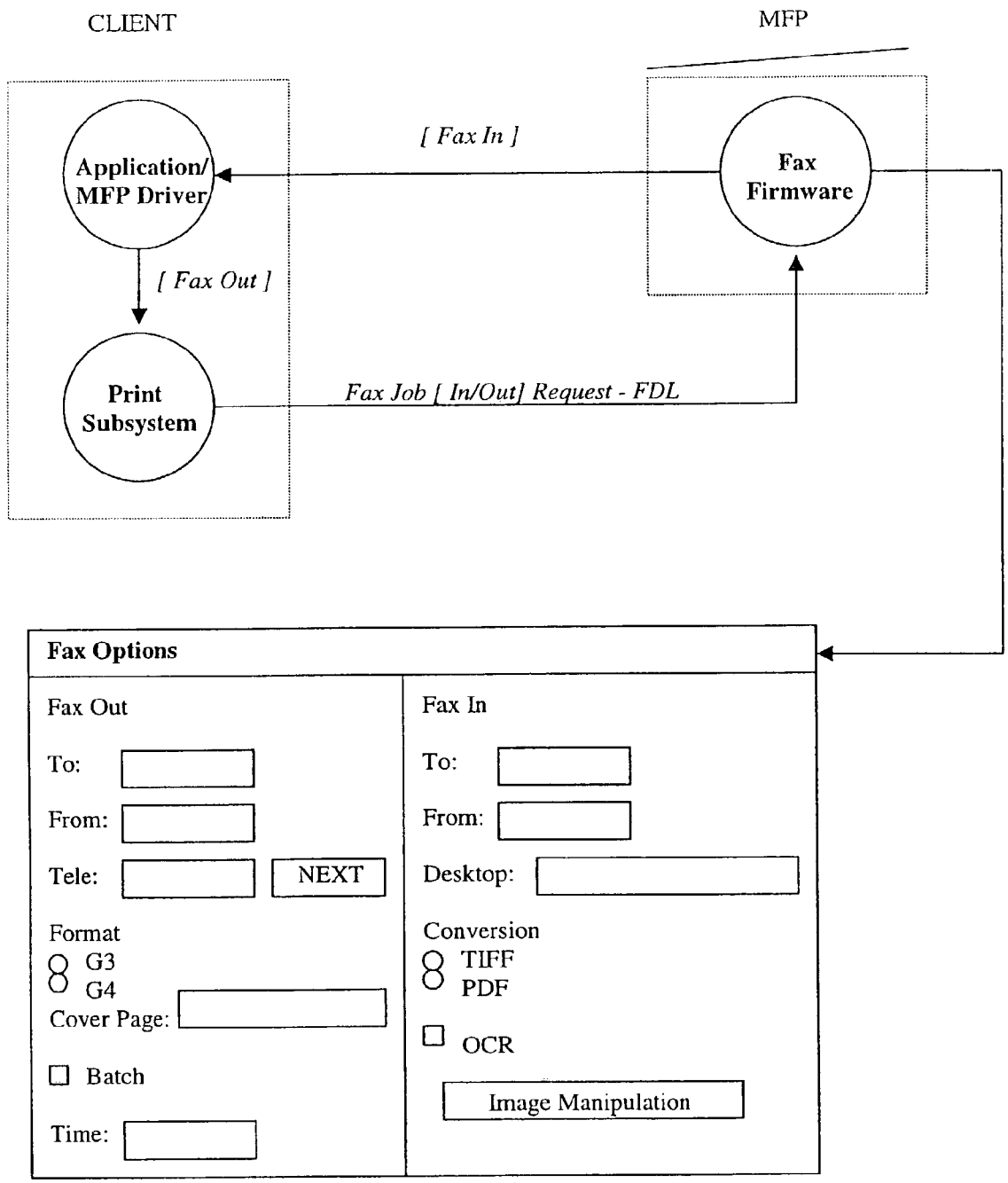
FIG. 15 illustrates a representative embodiment for providing a fax job request via a print subsystem utilizing a fax description language and a user interface at an MFP.

With reference now to FIGS. 14 and 15, representative configurations are provided for fax in requests as discussed in association with FIG. 13. In particular, FIG. 14 illustrates a representative embodiment for providing a fax in request via a print subsystem utilizing a fax description language. FIG. 15 illustrates a representative embodiment for providing a fax job request via a print subsystem utilizing a fax description language and a user interface at an MFP.

As provided above, while some embodiments embrace the utilization of Microsoft Windows® spooling and despooling subsystems, other embodiments embrace the spooling and despooling subsystems of the Apple® MacIntosh® operating system, Linux® operating system, System V Unix® operating systems, BSD Unix® operating systems, OSF Unix® operating systems, Sun® Solaris® operating systems, UP/UX operating systems, IBM® Mainframe MVS operating systems (OS/390), AS/400, and other operating systems.

Thus, as discussed herein, the embodiments of the present invention embrace providing computer based printing, scanning and faxing. In particular, the present invention relates to systems and methods for describing a fax operation as a sequence of commands from a fax description language (FDL) forming a program unit, wherein the program unit may be constructed, transmitted and executed in a single operational step. The present invention further relates to systems and methods for configuring, sending and/or retrieving facsimile messages for fax jobs, wherein the fax job requests are sent through a print subsystem.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. In a printing environment, a method for selectively processing a fax job using a multi-functional peripheral, the method comprising:
   initiating a fax request at a computer device in communication with the multi-functional peripheral, wherein the fax request is a request to retrieve a fax from the multi-functional peripheral and wherein the computer device includes a print subsystem having a print spooler;
   spooling a fax job corresponding to the fax request through the print subsystem of the computer device;
   despooling the fax job to a printer port associated with the multi-functional peripheral; and
   using the multi-functional peripheral to process the fax job.

2. A method as recited in claim 1, wherein initiating a fax request includes:
   constructing the fax job; and
   scheduling the fax job for despooling.

3. A method as recited in claim 2, wherein initiating a fax request is performed by at least one of (i) a user and (ii) an application.

4. A method as recited in claim 1, wherein spooling the fax job includes despooling the fax job to a print processor.

5. A method as recited in claim 1, wherein using the multi-functional peripheral includes connecting the multi-functional peripheral to a process on the computer device and sending the fax from the multi-functional peripheral to the computer device.

6. A method as recited in claim 5, wherein the multi-functional peripheral retrieves the fax from storage of the multi-functional peripheral.

7. A method as recited in claim 5, wherein the multi-functional peripheral pulls the fax from another location of which the multi-functional peripheral has been notified.

8. A method as recited in claim 1, wherein the fax is a future fax and wherein the request to retrieve the fax is a request instructing the multi-functional peripheral where to deliver future faxes.

9. A method as recited in claim 8, wherein using the multi-functional peripheral to process the fax job includes automatically routing the future fax to a destination indicated by the request to retrieve the fax.

10. A method as recited in claim 1, wherein using the multi-functional peripheral to process the fax job includes retrieving the fax from storage of the multifunctional peripheral, connecting with a receiving process at the computer device, and sending the fax to the receiving process at the computer device.

11. A method as recited in claim 10, wherein using the multi-functional peripheral to process the fax job further comprises converting the fax into a format compatible with the receiving process at the computer device.

12. A system configured to selectively exchange information via facsimile, the system comprising:

a computer device that includes a print subsystem, wherein the print subsystem includes a print spooler;

a multi-functional peripheral coupled to the computer device, wherein the multi-functional peripheral is configured to dynamically process a fax job that is configured to be spooled through the print subsystem and despooled to a printer port associated with the multi-functional peripheral, and wherein the fax job comprises a sequence of commands from a fax description language; and a fax request generated at the computer device, wherein the fax request corresponds to the fax job, and wherein the fax request is a request to retrieve a fax from the multi-functional peripheral that has been received and stored by the multi-functional peripheral.

13. A system as recited in claim 12, further comprising a network, wherein the network couples the computer device and the multi-functional peripheral.

14. A system as recited in claim 13, further comprising a server coupled to the network, and wherein the computer device is a client computer device.

15. A system as recited in claim 13, further comprising:

a second multi-functional peripheral coupled to the network; and an interpreter coupled to and employed by the multi-functional peripherals that is configured to accept a page description language for printing and the fax description language for faxing.

16. A system as recited in claim 15, wherein the interpreter is further configured to accept a scan description language for scanning.

17. A computer program product for implementing within a computer system a method for selectively processing a fax job using a multi-functional peripheral, the computer program product comprising:

a computer readable medium for providing computer program code means utilized to implement the method, wherein the computer program code means is comprised of executable code for:

constructing a fax request at a computer device in communication with the multi-functional peripheral, the computer device including a print subsystem having a print spooler, wherein the fax request is a request to retrieve a fax from the multi-functional peripheral;

spooling a fax job corresponding to the fax request through the print subsystem of the computer device, wherein the fax job is constructed as a sequence of commands from a fax description language;

despooling the fax job to a printer port associated with the multi-functional peripheral for processing of the fax job at the multi-functional peripheral.

18. A computer program product as recited in claim 17, wherein constructing the fax request includes:

constructing the fax job; and scheduling the fax job for despooling.

19. A computer program product as recited in claim 17, wherein spooling the fax job includes despooling the fax job to a print processor.

20. A computer program product as recited in claim 17, wherein the executable code further implements recognizing the fax job as a fax request.

21. A computer program product as recited in claim 17, wherein the request to retrieve a fax from the multi-functional peripheral is one of: (i) a request to retrieve a fax already received and stored by the multi-functional peripheral and (ii) a request instructing the multi-functional peripheral where to deliver future faxes.

* * * * *